(12) United States Patent
Herring

(10) Patent No.: US 9,209,539 B2
(45) Date of Patent: Dec. 8, 2015

(54) BACKPLANE OR MIDPLANE COMMUNICATION SYSTEM AND CONNECTOR

(71) Applicant: Tyco Electronics Corporation, Berwyn, PA (US)

(72) Inventor: Michael David Herring, Apex, NC (US)

(73) Assignee: Tyco Electronics Corporation, Berwyn, PA (US)

( * ) Notice: Subject to any disclaimer, the term of this patent is extended or adjusted under 35 U.S.C. 154(b) by 71 days.

(21) Appl. No.: 14/151,250

(22) Filed: Jan. 9, 2014

(65) Prior Publication Data

US 2015/0194751 A1 Jul. 9, 2015

(51) Int. Cl.
*H01R 12/00* (2006.01)
*H01R 12/71* (2011.01)
*H01R 13/6586* (2011.01)
*H04Q 1/00* (2006.01)

(52) U.S. Cl.
CPC .......... *H01R 12/716* (2013.01); *H01R 13/6586* (2013.01); *H04Q 1/00* (2013.01)

(58) Field of Classification Search
CPC .................................................. H01R 23/7068
USPC ................................ 439/61, 49; 361/788, 785
See application file for complete search history.

(56) References Cited

U.S. PATENT DOCUMENTS

| | | | | |
|---|---|---|---|---|
| 5,915,999 | A | * | 6/1999 | Takenaka et al. ............. 439/751 |
| 6,135,784 | A | * | 10/2000 | Pei .................................. 439/70 |
| 6,592,401 | B1 | * | 7/2003 | Gardner et al. ............... 439/544 |

* cited by examiner

*Primary Examiner* — Phuong Dinh

(57) ABSTRACT

Communication system including a circuit board having opposite board sides and mounting areas located on at least one of the board sides. The circuit board includes conductive traces that extend along the circuit board between corresponding mounting areas. The circuit board has mounting holes extending therethrough. The communication system also includes board connectors mounted to the circuit board at the mounting areas. The board connectors are communicatively coupled to one another through the conductive traces. The communication system also includes cable connectors secured to the circuit board and positioned at the mounting holes. The communication system also includes communication cables interconnecting corresponding cable connectors to one another.

20 Claims, 12 Drawing Sheets

BACKPLANE OR MIDPLANE COMMUNICATION SYSTEM AND CONNECTOR

BACKGROUND OF THE INVENTION

The subject matter herein relates generally to backplane or midplane communication systems that utilize large circuit boards with electrical connectors mounted thereto.

Backplane or midplane communication systems, such as network systems, servers, data centers, and the like, use large circuit boards, known as backplanes or midplanes, to interconnect daughter card assemblies. In a conventional system, the circuit board has an array of electrical connectors mounted thereto. The daughter card assemblies, which may be line card assemblies or switch card assemblies, include a daughter card, such as a circuit board, having one or more data connectors positioned along a leading edge of the daughter card. Each of the data connectors is configured to mate with one of the electrical connectors. The electrical connectors are communicatively coupled to one another by traces that are routed through the circuit board. Accordingly, two daughter card assemblies may be communicatively coupled to one another through the traces of the circuit board.

Recently, market demand has been toward communication systems with greater throughput and/or complexity. For example, a density of electrical connectors, a density of signal paths through the system, a speed of data transmission, and an overall area of the circuit board have generally increased. As a result, it has become more challenging to effectively route the traces through the circuit board while maintaining a baseline level of signal quality. For example, it is known that the longer a trace extends through a circuit board, the greater the likelihood that the signal quality will decrease. To maintain the desired baseline level of signal quality while increasing trace length, known systems have used additional devices, such as re-timers, or have used traces formed from a different material. Either of these options can be relatively expensive.

At least some of these conventional systems have been replaced by cabled communication systems. In a cabled system, cable connectors are mechanically mounted to the circuit board (or other structure, such as sheet metal) and are communicatively coupled to one another through cables. The cable connectors may operate in a similar manner as the electrical connectors of the conventional system. By using cables, communication systems may avoid the use of traces through the circuit board and, in some cases, may avoid using the circuit board entirely. However, the cabled systems can be more expensive than the conventional systems that utilize a circuit board with traces.

Accordingly, a need remains for a backplane or midplane communication system that has a sufficient throughput and is cost effective.

BRIEF DESCRIPTION OF THE INVENTION

In one embodiment, a communication system is provided that includes a circuit board having opposite board sides and mounting areas located on at least one of the board sides. The circuit board includes conductive traces that extend along the circuit board between corresponding mounting areas. The circuit board has mounting holes extending therethrough. The communication system also includes board connectors mounted to the circuit board at the mounting areas. The board connectors are communicatively coupled to one another through the conductive traces. The communication system also includes cable connectors secured to the circuit board and positioned at the mounting holes. The communication system also includes communication cables interconnecting corresponding cable connectors to one another.

In some embodiments, at least some of the board contacts and at least some of the cable contacts have effectively identical mating interfaces. For example, the contacts of a data connector may be capable of mating with either of the board contacts or the cable contacts.

In another embodiment, an electrical connector is provided that includes a connector housing having opposite mating and mounting sides. The connector housing includes a board section and a cable section that are each configured to engage a common data connector along the mating side. The board section is configured to engage a circuit board along the mounting side. The electrical connector also includes board contacts coupled to the board section of the connector housing. The board contacts are configured to directly engage vias of the circuit board. The electrical connector also includes cable contacts positioned along the cable section of the connector housing proximate to the board contacts. The electrical connector also includes communication cables that are terminated to the cable contacts. The board contacts and the cable contacts collectively form a common contact array along the mating side that is configured to engage the data connector.

In some embodiments, the connector housing is a single continuous structure such that the cable section and the board section are not separable. In other embodiments, however, the board section and the cable section are separate components that are positioned adjacent to each other to form the connector housing.

DETAILED DESCRIPTION OF THE INVENTION

Embodiments set forth herein include backplane or midplane communication systems and electrical connectors that may be used with such communication systems. The electrical connectors may be board connectors that are mounted directly to a backplane or midplane circuit board, cable connectors that are coupled to communication cables and the circuit board (or other support structure), or hybrid connectors. Hybrid connectors may include some features that are possessed by cable connectors and some features that are possessed by board connectors. For example, a portion of the hybrid connector may be capable of being directly mounted to the circuit board and another portion of the hybrid connector may be coupled to communication cables. In such embodiments, the hybrid connectors may be capable of communicating with one or more cable connectors through the communication cables and one or more board connectors through conductive traces of the circuit board. Accordingly, the communication system may be referred to as a hybrid communication system, in some embodiments, because both conductive traces of the circuit board and communication cables may communicatively couple the different electrical connectors.

Figure 1:
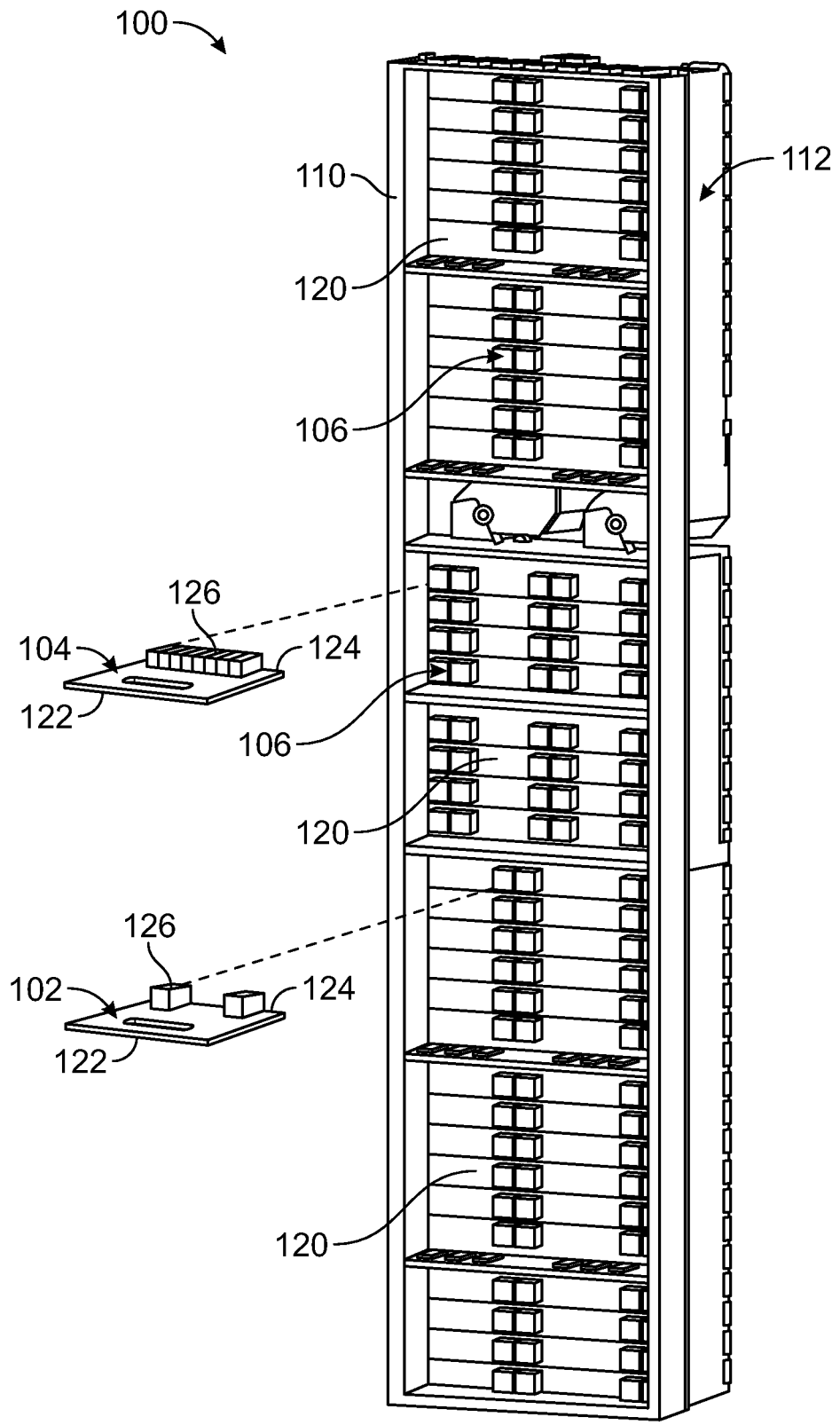
FIG. 1 is a front perspective view of a backplane communication system formed in accordance with an embodiment.

FIG. 1 is a front view of a backplane communication system 100 formed in accordance with an embodiment. In other embodiments, the communication system 100 may be a midplane communication system. The communication system 100 is configured to interconnect daughter card assemblies, such as line card assemblies 102 and switch card assemblies 104, using board connectors and cable connectors. The board connectors and cable connectors are generally referred to as electrical connectors 106 in FIG. 1. The electrical connectors 106 are coupled to a plurality of circuit boards 120, which may be backplane or midplane circuit boards. The line and switch card assemblies 102, 104 include daughter cards 122 having leading edges 124 with electrical connectors 126 mounted therealong. The electrical connectors 126 are hereinafter referred to as data connectors to differentiate the electrical connectors 126 from other electrical connectors described herein. As described in greater detail below, the electrical connectors 106 may form a hybrid communication system in which at least some of the line and switch card assemblies 102, 104 are interconnected through a combination of (a) conductive traces that extend through the circuit boards 120 and (b) communication cables (not shown) that extend along but separate from the circuit boards 120.

The communication system 100 includes a chassis 110 for supporting components of the communication system 100. The chassis 110 may include a cabinet and/or other suitable structure that holds the circuit boards 120 and, optionally, the line and switch card assemblies 102, 104. For example, the communication system 100 may include a cable manager 112 that supports and/or manages the communication cables of the communication system 100. In some embodiments, the cable manager 112 may include a cavity or void (not shown) that extends behind the circuit boards 120 in FIG. 1. The communication cables may extend through the cavity between the interconnected cable connectors.

As shown, the communication system 100 includes a plurality of the circuit boards 120. In the illustrated embodiment, the circuit boards 120 are separate units which are individually mounted to and supported by the chassis 110. For example, three circuit boards 120 are separately mounted to the chassis 110 in FIG. 1. The circuit boards 120 are configured to hold the electrical connectors 106 in designated locations for mating with the line and switch card assemblies 102, 104. The circuit boards 120 also include conductive traces (not shown) that interconnect the electrical connectors 106 which are board connectors.

Figure 2:
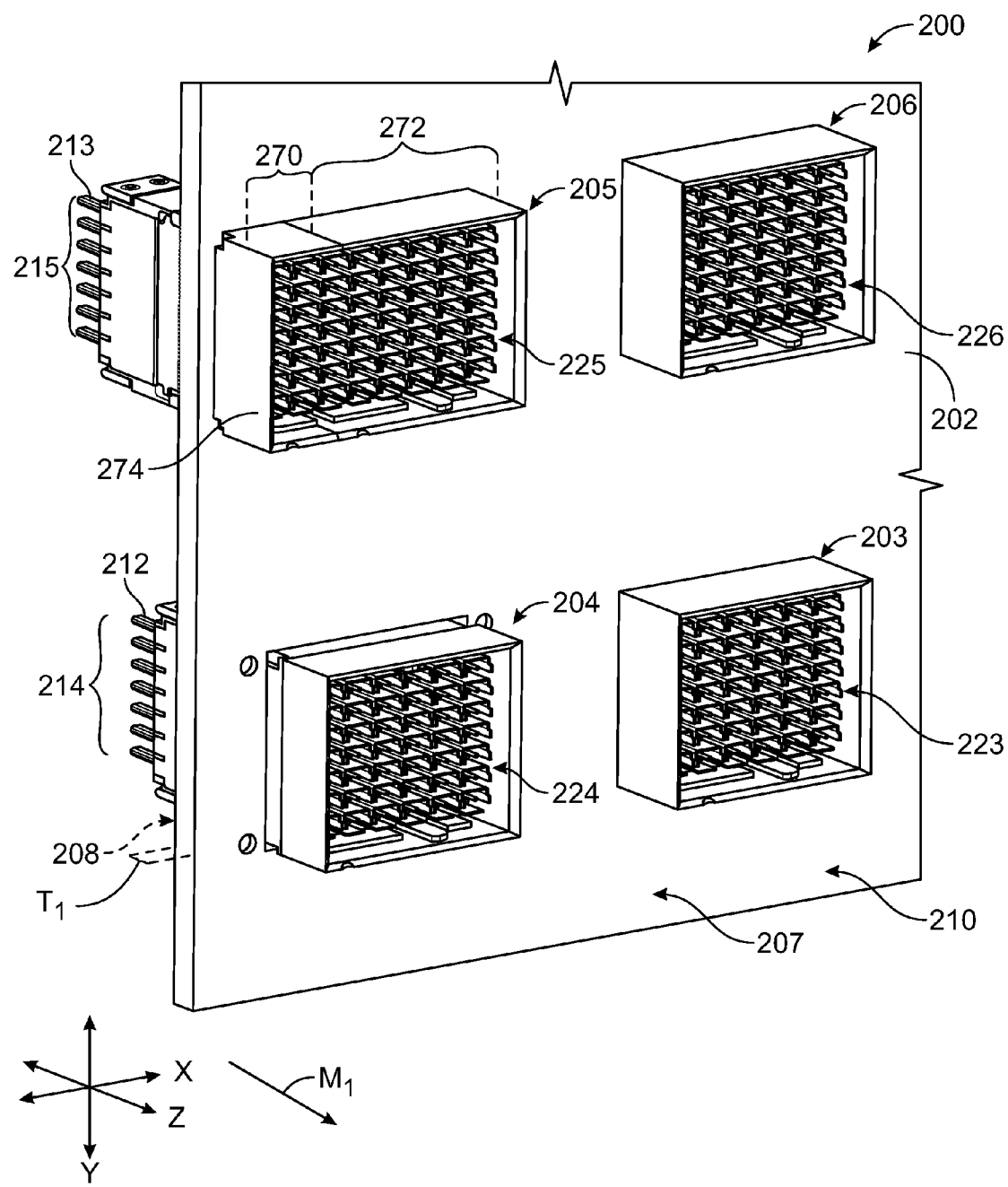
FIG. 2 is a front perspective view of a portion of a backplane communication system formed in accordance with an embodiment.

FIG. 2 is a perspective view of a portion of a communication system 200 that includes a backplane circuit board 202 and electrical connectors 203, 204, 205, 206 that are coupled to the circuit board 202. The communication system 200 may be similar to the communication system 100. For example, the electrical connectors 203-206 may be used as the electrical connectors 106 in FIG. 1. For reference, the communication system 200 is oriented with respect to mutually perpendicular X-, Y-, and Z-axes. Embodiments may include a number of components that are not shown in FIG. 2, such as a chassis that supports the circuit board 202 or other components for operating the communication system 200, such as a cooling fan, power supplies, etc. As shown, the circuit board 202 includes front and back board sides 207, 208 that face in opposite directions along the Z-axis. The circuit board 202 has a thickness $T_1$ that is defined between the board sides 207, 208. The circuit board 202 coincides along a board plane $P_1$ (shown in FIG. 3) that extends parallel to the X- and Y-axes.

The electrical connectors 203-206 may be part of a two-dimensional connector array 210. Only a portion of the connector array 210 is shown in FIG. 2. Each of the electrical connectors 203-206 may be electrically coupled to another electrical connector in the connector array 210. To differentiate the electrical connectors, the electrical connectors 203-206 may also be referred to as a board connector 203, a cable connector 204, a hybrid connector 205, and a board connector 206. The board connectors 203, 206 are mechanically and electrically coupled to the circuit board 202. The cable connector 204 is mechanically coupled to the circuit board 202 and electrically coupled to another cable connector through a cable bundle 214 having a plurality of communication cables 212.

The hybrid connector 205 is mechanically coupled to the circuit board 202 and electrically coupled to both the circuit board 202 and a cable connector (not shown) of the connector array 210. The hybrid connector 205 is electrically coupled to the cable connector through communication cables 213 of a cable bundle 215. (For illustrative purposes, only portions of the cable bundles 214, 215 are shown in FIG. 2.) The hybrid connector 205 may include components and features that are similar or identical to the board connector 203, and components and features that are similar or identical to the cable connector 204. For example, the hybrid connector 205 may include a cable connector (or cable connector portion) 270 that is similar to the cable connector 204 and a board connector (or board connector portion) 272 that is similar to the board connector 203. In the illustrated embodiment, the cable connector 270 and the board connector 272 share a connector housing 274 that is a single continuous element, such as a single molded component. In alternative embodiments, the connector housing 274 may include separate components.

The electrical connectors 203-206 have mating sides 223, 224, 225, 226, respectively, that face in a common mating direction $M_1$ along the Z-axis. Each of the electrical connectors 203-206 is configured to mate with a corresponding data connector (not shown). The data connector may be part of a daughter card assembly, such as the line card assembly 102 or the switch card assembly 104 of FIG. 1. The electrical connectors 203-205 are described in greater detail below.

Figure 3:
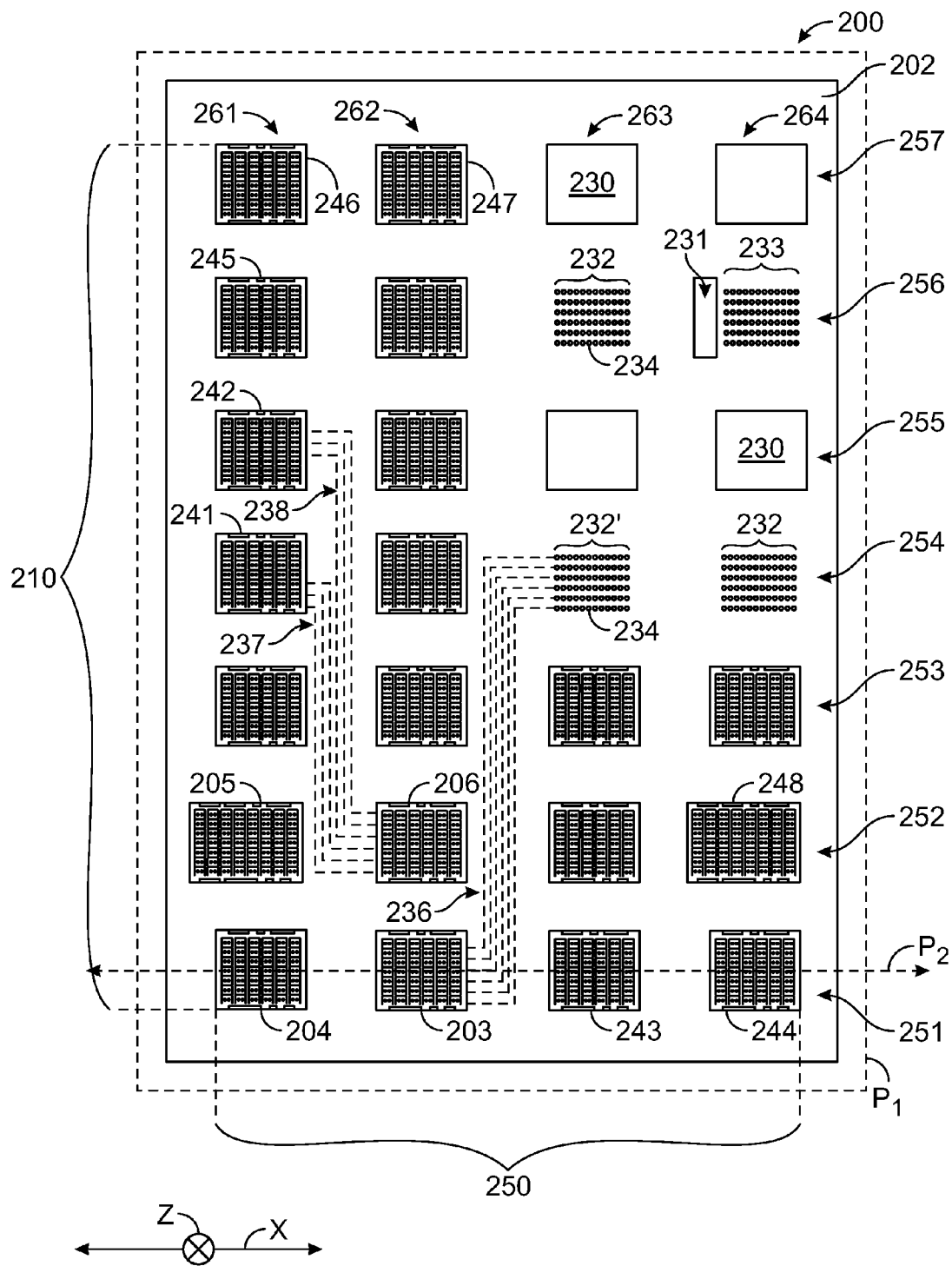
FIG. 3 is a plan view of a portion of the communication system of FIG. 2 illustrating a connector array.

FIG. 3 is a front view of the communication system 200 illustrating the connector array 210 in greater detail. The connector array 210 includes the electrical connectors 203-206 and other electrical connectors 241, 242, 243, 244, 245, 246, 247, 248. The electrical connectors 241-248 include board connectors 241, 242, cable connectors 243, 244, 245, 246, 247, and a hybrid connector 248. For illustrative purposes, other electrical connectors in the connector array 210 have been removed to show mounting holes 230, 231 and mounting areas 232, 233. The mounting areas 232, 233 represent designated areas of the circuit board 202 that include arrays of vias or plated thru-holes 234. The vias 234 are electrically coupled to vias of another mounting area through conductive traces, such as conductive traces 236, 237, 238. Because the conductive traces 236-238 extend within the circuit board 202, the conductive traces 236-238 are indicated as dashed lines. Board connectors are configured to be mounted to the circuit board 202 at the mounting areas 232. The mounting area 233 is configured to interface with a board connector portion of a hybrid connector.

The mounting holes 230 are sized and shaped to receive a corresponding cable connector of the communication system 200. The mounting hole 231 is configured to receive a cable connector portion of the hybrid connector that is also coupled to the mounting area 233. Each cable connector may be coupled to the circuit board 202 and extend through a corresponding mounting hole 230, 231. In other embodiments, however, the cable connectors may not extend through the mounting hole 230. For example, the cable connector may be positioned proximate to the mounting hole 230 to receive a data connector that is inserted through the corresponding mounting hole 230. In other embodiments, the communication system 200 may include another support structure (not shown), such as sheet metal, that is positioned proximate to the circuit board 202. One or more of the mounting holes 230 may be part of the support structure.

The communication system 200 includes signal paths for transmitting electrical current in the form of data signals. As used herein, a signal path includes interconnected conductive elements, such as contacts, traces, wires, and the like, that permit the transmission of data signals between different components. For example, each of the electrical connectors 203-206 and 241-248 may include portions of a plurality of signal paths. In some embodiments, the signal paths that extend through one electrical connector will be communicatively coupled to only one other electrical connector. For example, the signal paths of the electrical connector 203 may be exclusively connected through the conductive traces 236 to the electrical connector (not shown) that is mounted to the mounting area 232'. In other cases, the signal paths that extend through an electrical connector will be communicatively coupled to more than one electrical connector. For example, the signal paths of the electrical connector 206 may be electrically coupled to the board connectors 241, 242 through conductive traces 237, 238, respectively.

For embodiments in which the electrical connector is a cable connector, the cable connector may be electrically coupled to only one other cable connector or the cable connector may be electrically coupled to more than one other cable connector. For instance, the communication cables 212 (FIG. 2) coupled to the cable connector 204 may only couple to the cable connector 246. Alternatively, some of the communication cables 212 may couple to the cable connector 246 and some of the communication cables 212 may diverge and couple to the cable connector 247.

The electrical connectors 203-206, 241-248 of the connector array 210 are positioned in a designated arrangement for achieving a desired performance (e.g., signal quality and/or throughput). The connector array 210 may include the electrical connectors 203-206, 241-248 being arranged in rows and/or columns. For example, as shown in FIG. 3, the electrical connectors 203-206, 241-248 and other electrical connectors are arranged in rows 251, 252, 253, 254, 255, 256, 257 and columns 261, 262, 263, 264. Each of the electrical connectors in a single column or in a single row may form a linear array (or sub-array) that is aligned along a connector plane. For example, the electrical connectors 203, 204, 243, and 244 may form a linear array 250 that is aligned along a connector plane $P_2$ that extends orthogonal to the board plane $P_1$. The connector plane $P_2$ may extend parallel to the X- and Z-axes. A linear array of connectors may engage the data connectors of a single daughter card assembly, such as the line card assembly 102 or the switch card assembly 104. Depending upon the orientation of the daughter card assembly, the daughter card assembly may engage different types of electrical connectors. For example, a single daughter card assembly engaging the linear array 250 would engage the cable connectors 204, 243, 244 and the board connector 203. A single daughter card assembly engaging the electrical connectors along the column 261 would engage the cable connectors 204, 245, 246, the board connectors 241, 242, and the hybrid connector 205.

The cable connectors, hybrid connectors, and corresponding cables of the communication system 200 may enable technicians and other users of the communication system 200 to position interconnected electrical connectors further apart while also satisfying a desired signal integrity and/or throughput of the communication system 200. The interconnected electrical connectors may be located along opposite ends or sides of the connector array 210. For example, the rows 251, 257 and the columns 261, 264 may extend along a periphery of the connector array 210. The cable connector 204 is located along the periphery in the bottom row 251 or the column 261, and the cable connectors 246, 247 are located along the periphery in the top row 257. In conventional systems, the distance between the cable connector 204 and the cable connectors 246, 247 may be too long to use conductive traces for interconnecting the connectors. Accordingly, communication cables may permit greater separation distances while also satisfying signal integrity requirements. Moreover, by permitting the use of conductive traces and communication cables to interconnect the electrical connectors 203-206, 241-248, designers of the communication system 200 may have more options for configuring the communication system 200 without exceeding certain costs.

Figure 4:
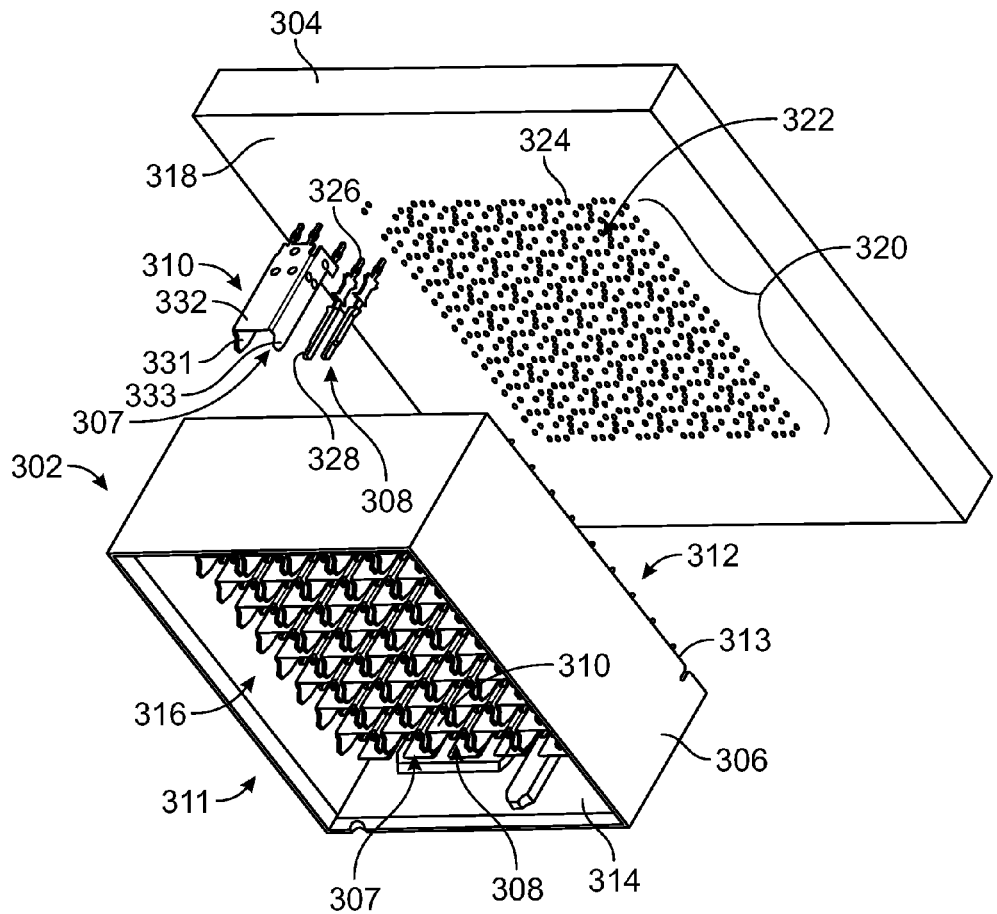
FIG. 4 is a front perspective view of a board connector that may be used with the communication system of FIG. 2.

FIG. 4 is a front perspective view of a board connector 302 formed in accordance with one embodiment that is configured to be mounted to a circuit board 304. The board connector 203 (FIG. 2) may be similar to the board connector 302 and include similar or identical components or features. The board connector 302 includes a connector housing 306 that may comprise a dielectric material. The connector housing 306 is configured to hold a plurality of contact assemblies 307 in a designated arrangement. In the illustrated embodiment, each of the contact assemblies 307 includes board contacts 308 and a ground contact or shield 310. The board contacts 308 are configured to transmit data signals and, as such, may also be referred to as signal contacts.

The connector housing 306 has opposite mating and mounting sides 311, 312. The mounting side 312 is configured to interface with the circuit board 304 when the connector housing 306 is mounted thereto. The mating side 311 is configured to engage a data connector (not shown), such as the electrical connectors 126 (FIG. 1). The connector housing 306 includes an intermediate or interior wall 313. The intermediate wall 313 includes passages (not shown) through which the board and ground contacts 308, 310 extend. The board and ground contacts 308, 310 may form interference fits with surfaces (not shown) that define the passages. Also shown, the connector housing 306 may include a plurality of shroud walls 314 that extend from the intermediate wall 313. The shroud walls 314 may define a contact cavity 316 of the board connector 302 where the board and ground contacts 308, 310 are disposed. The shroud walls 314 may be shaped to receive and guide the data connector during a mating operation.

Likewise, the circuit board 202 (FIG. 2) may be similar or identical to the circuit board 304. For example, the circuit board 304 has a front board side 318 that includes a mounting area 320. The mounting area 320 may represent the area along the board side 318 that interfaces with the mounting side 312 or the intermediate wall 313 of the board connector 302. The mounting area 320 includes an array 322 of conductive vias 324 that extend into the circuit board 304 and electrically couple to corresponding conductive traces (not shown), which may be similar to the conductive traces 236-238 (FIG. 3).

The board contacts 308 may include mounting pins 326 that are configured to project from the intermediate wall 313. The mounting pins 326 may be inserted into corresponding conductive vias 324 such that the mounting pins 326 are mechanically and electrically connected to the conductive vias 324. The mounting pins 326 may be compliant pins or press-fit pins. For example, the mounting pins 326 may have an eye-of-needle (EON) shape as shown in FIG. 4. The board contacts 308 may also include contact or mating portions 328 that are configured to engage corresponding contacts (not shown) of the data connector. The contact portions 328 may be pins as shown in FIG. 4 or may have other mating interfaces, such as sockets, blades, spring beams and the like. In the illustrated embodiment, the mounting pin 326 and the contact portion 328 are part of the same continuous structure. In alternative embodiments, the mounting pin 326 and the contact portion 328 may be separate components that electrically couple to each other.

In the illustrated embodiment, the board contacts 308 are arranged in pairs for differential signal transmission. The ground contacts 310 may be C-shaped and provide shielding on three sides of the pair of board contacts 308. For instance, the ground contacts 310 may have three sidewalls 331, 332, 333. However, other configurations or shapes for the ground contacts 310 are possible in alternative embodiments. For example, the ground contacts 310 may be L-shaped or have a semi-circular shape that partially surrounds the pair of board contacts 308. In alternative embodiments, the ground contacts 310 may provide shielding for individual board contacts 308 or, alternatively, contact sets that include more than two of the board contacts 308.

Figure 5:
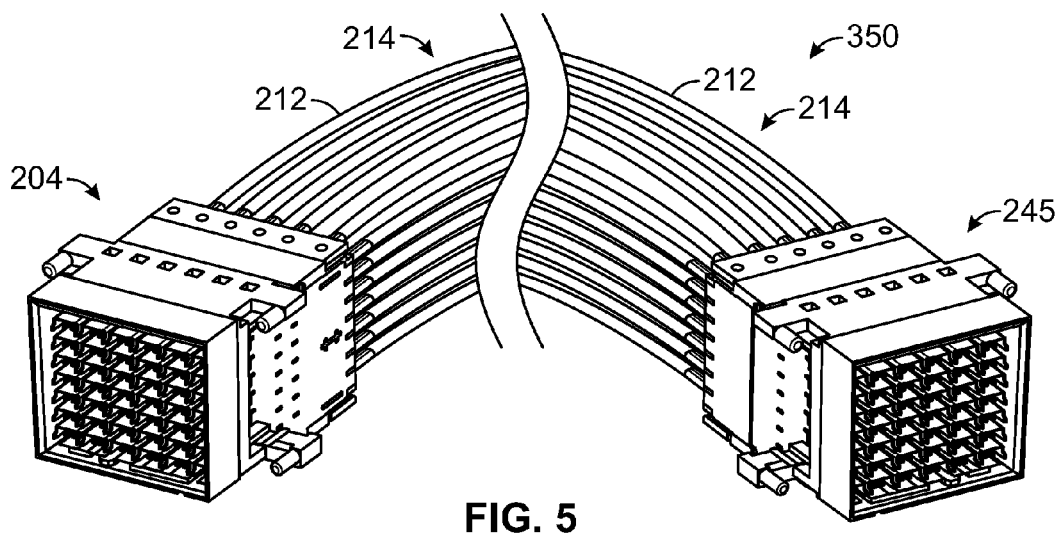
FIG. 5 illustrates an interconnect assembly in accordance with one embodiment that may be used with the communication system of FIG. 2.

FIG. 5 illustrates an interconnect assembly 350 formed in accordance with an exemplary embodiment. The interconnect assembly 350 includes the cable connector 204 and the cable bundle 214 of the communication cables 212. In the illustrated embodiment, the interconnect assembly 350 also includes the cable connector 245, which may be similar or identical to the cable connector 204. In an exemplary embodiment, the cable connectors 204, 245 are high speed cable connectors that include a plurality of differential pairs of conductors. The communication cables 212 extend between and communicatively couple the cable connectors 204, 245. In the illustrated embodiment, the cable bundle 214 only interconnects the two cable connectors 204, 245. In alternative embodiments, however, the interconnect assembly 350 may include more than the two cable connectors 204, 245. For example, the communication cables 212 extending from the cable connector 204 may diverge such that some of the communication cables 212 couple to the cable connector 245 and other cables 212 couple to a third cable connector (not shown). The other cable connector may be a cable connector portion, such as the cable connector 270 (FIG. 2). A length of the communication cables 212 may be based on locations of the cable connectors 204, 245 in the connector array 210 (FIG. 2).

FIGS. 6-10 illustrate the cable connector 204 or components thereof in greater detail. Although the following is with specific reference to the cable connector 204, the description may be similarly applied to the cable connector 245 or other cable connectors of the connector array 210 (FIG. 2). In some cases, the hybrid connector 205 (FIG. 2) may include features and components that are similar to those in the cable connector 204.

Figure 6:
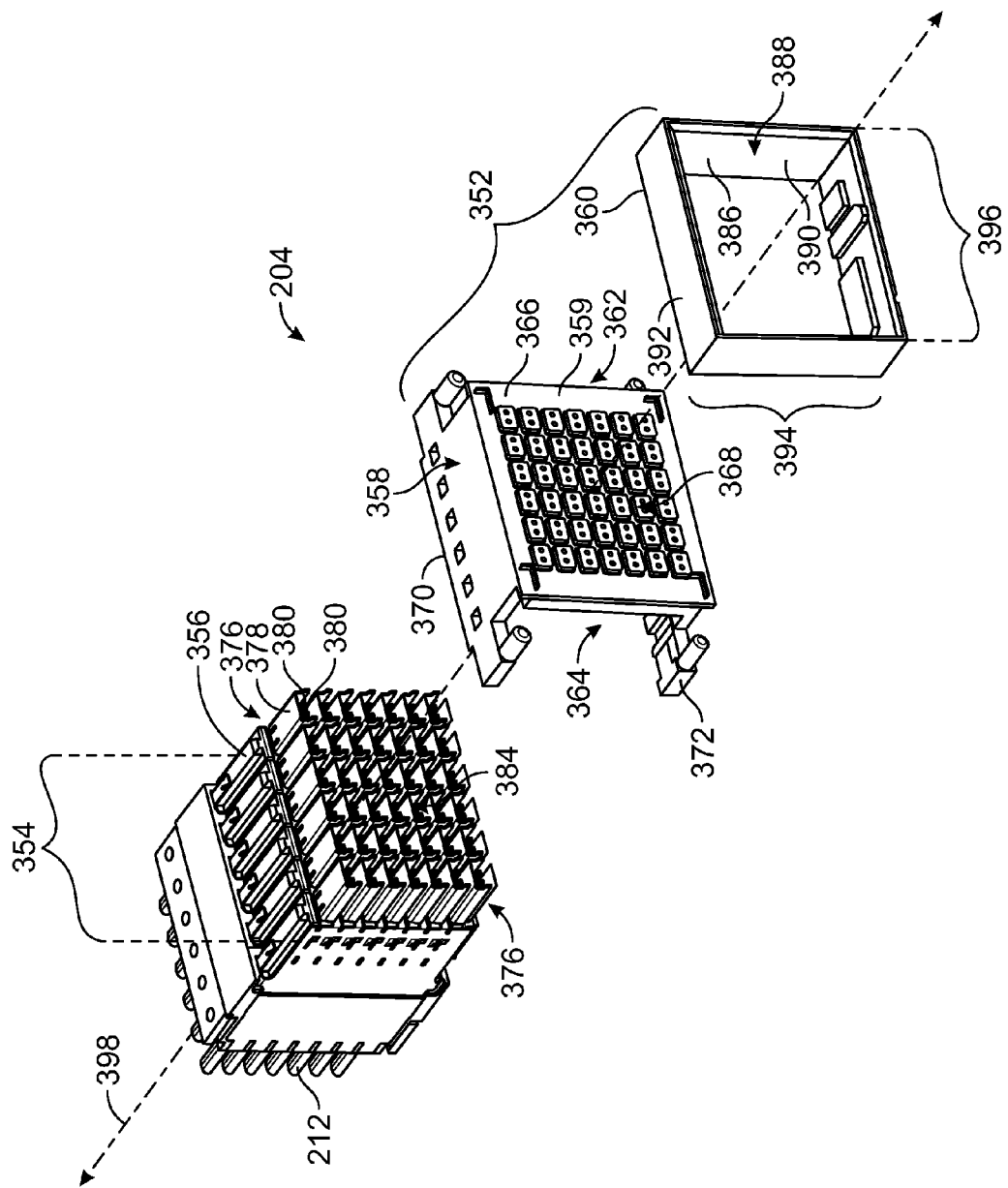
FIG. 6 is a partially exploded view of a cable connector that may be used with the communication system of FIG. 2.

FIG. 6 is a partially exploded view of the cable connector 204. As shown, the cable connector 204 includes a connector housing 352 and a module assembly 354 that includes a plurality of contact modules 356. The contact modules 356 are configured to be held side-by-side by the connector housing 352. In the illustrated embodiment, the connector housing 352 includes a contact organizer 358 and a shroud 360 that are separate pieces but coupled together to form the connector housing 352. In alternative embodiments, however, the connector housing 352 may be a single-piece structure, such as a molded structure, that includes the features of the contact organizer 358 and the shroud 360 described herein.

As shown, the module assembly 354, the contact organizer 358, and the shroud 360 are oriented with respect to a central longitudinal axis 398. The contact organizer 358 may include an intermediate wall 359 that has opposite mating and loading surfaces 362, 364 and a plurality of passages 366 that extend therethrough between the mating surface 362 and the loading surface 364. The passages 366 collectively form a passage array 368 through the intermediate wall 359. The contact organizer 358 may also include rearward body extensions 370, 372. The body extensions 370, 372 project from the intermediate wall 359 in a rearward direction along the longitudinal axis 398 and are configured to engage the module assembly 354.

Each of the contact modules 356 may include a plurality of contact assemblies 376. Each of the contact assemblies 376 may include a ground contact 378 and a pair of cable contacts 380. The cable contacts 380 are terminated to the communication cables 212 and are configured to transmit data signals. Thus, the cable contacts 380 may also be referred to as signal contacts. In alternative embodiments, the contact assemblies 376 may not include a ground contact and/or may include a different number of cable contacts. The ground contacts 378 and the cable contacts 380 of the different contact assemblies 376 may collectively form a contact array 384. Each passage 366 of the passage array 368 is configured to receive a corresponding contact of the contact array 384.

The shroud 360 includes a plurality of shroud walls 386 that surround a contact cavity 388. The shroud walls 386 have interior surfaces 390 that define the contact cavity 388. The shroud walls 386 have exterior surfaces 392 that define outer dimensions of the shroud 360. For example, the shroud 360 may be substantially rectangular and have a height 394 and a width 396. The height 394 and the width 396 may be configured such that the shroud 360 may be inserted through a corresponding mounting hole, such as the mounting hole 230 (FIG. 3).

To assemble the cable connector 204, the shroud 360 may be mounted to the mating surface 362 of the intermediate wall 359. The contact organizer 358 may be coupled to the module assembly 354 such that the ground contacts 378 and the cable contacts 380 of the contact array 384 are received through the corresponding passages 366. The body extensions 370, 372 may engage the module assembly 354. In some embodiments, the contact organizer 358 may be coupled to the module assembly 354 before the shroud 360 is mounted to the contact organizer 358.

Figure 7:
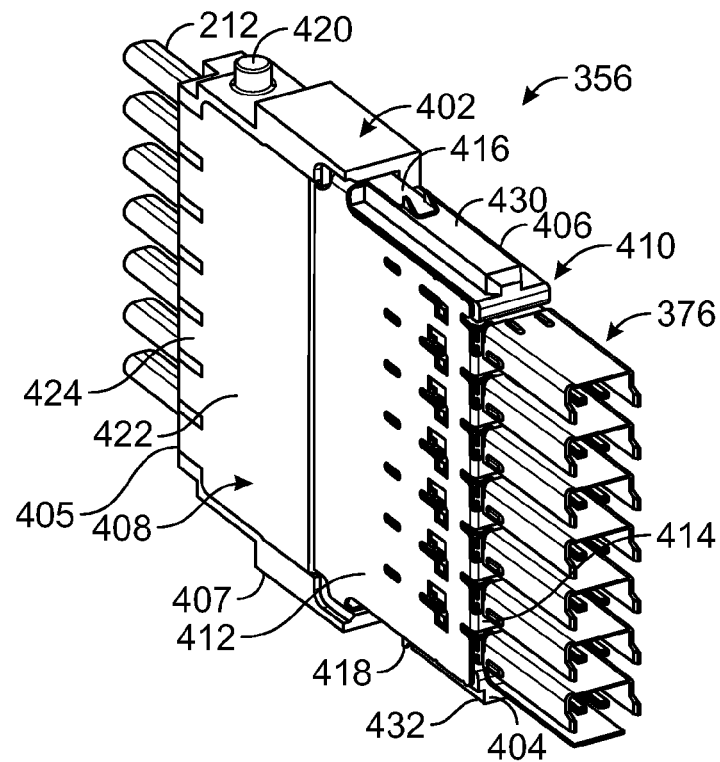
FIG. 7 is a perspective view of an exemplary contact module that may be part of the cable connector of FIG. 6.

FIG. 7 is a perspective view of one of the contact modules 356. In the illustrated embodiment, the contact module 356 includes a module frame 402 that is configured to hold a plurality of the contact assemblies 376 forming a portion of the contact array 384 (FIG. 6). The module frame 402 may comprise a dielectric material and include body edges 404, 405, 406, 407. The body edges 404-407 include a leading edge 404, a loading edge 405, and longitudinal edges 406, 407 that extend between the leading and loading edges 404, 405. The leading and loading edges 404, 405 may extend substantially perpendicular to the longitudinal edges 406, 407. The longitudinal edges 406, 407 are configured to extend along the longitudinal axis 398 (FIG. 6) between the leading and loading edges 404, 405. The contact module 356 also include opposite module sides 408, 410. The body edges 404-407 extend between the module sides 408, 410.

As shown, the contact module 356 includes guide features 430, 432 that extend along the longitudinal edges 406, 407, respectively. In the illustrated embodiment, the guide features 430, 432 are elongated projections or rails that extend lengthwise along the corresponding longitudinal edge. In alternative embodiments, the guide features 430, 432 may be channels or grooves that extend along the longitudinal edges 406, 407 and are configured to receive projections or rails.

The contact module 356 may include a first shield 412 and a second shield 422 that are located along the module side 408. Alternatively, the first and second shields 412, 422 may be located along the module side 410. The first and second shields 412, 422 extend between the signal paths of adjacent contact modules 356 to shield the signal paths from crosstalk. As shown, the first shield 412 extends between the longitudinal edges 406, 407 and along the leading edge 404 of the module frame 402. The first shield 412 may be a substantially planar body that is stamped and formed from sheet metal. The first shield 412 may include grip elements 414 that are configured to engage the module frame 402 along or proximate to the leading edge 404. The grip elements 414 may be fingers or projections that grip the module frame 402.

The second shield 422 extends between the longitudinal edges 406, 407 and along the loading edge 405. The second shield 422 may also be a substantially planar body and include grip elements 424 that are configured to engage the module frame 402 along or proximate to the loading edge 405. When combined, the first and second shields 412, 422 may cover substantially the entire module side 408. In alternative embodiments, a single shield may extend along the module side 408 instead of multiple shields.

The contact module 356 may also include one or more locking members that are configured to engage and secure the contact module 356 to the connector housing 352 (FIG. 6). For example, in the illustrated embodiment, the contact module 356 includes locking members 416, 418, which are formed from the first shield 412 and are positioned along the longitudinal edges 406, 407, respectively. The locking members 416, 418 may be latches or spring members that are configured to be deflected toward the corresponding longitudinal edge and resiliently flex away from the corresponding longitudinal edge. In other embodiments, the first shield 412 does not include the locking members 416, 418. For example, the module frame 402 may be shaped to include locking members similar to the locking members 416, 418. Alternatively, the locking members may be separate parts that are coupled to the module frame 402.

Figure 10:
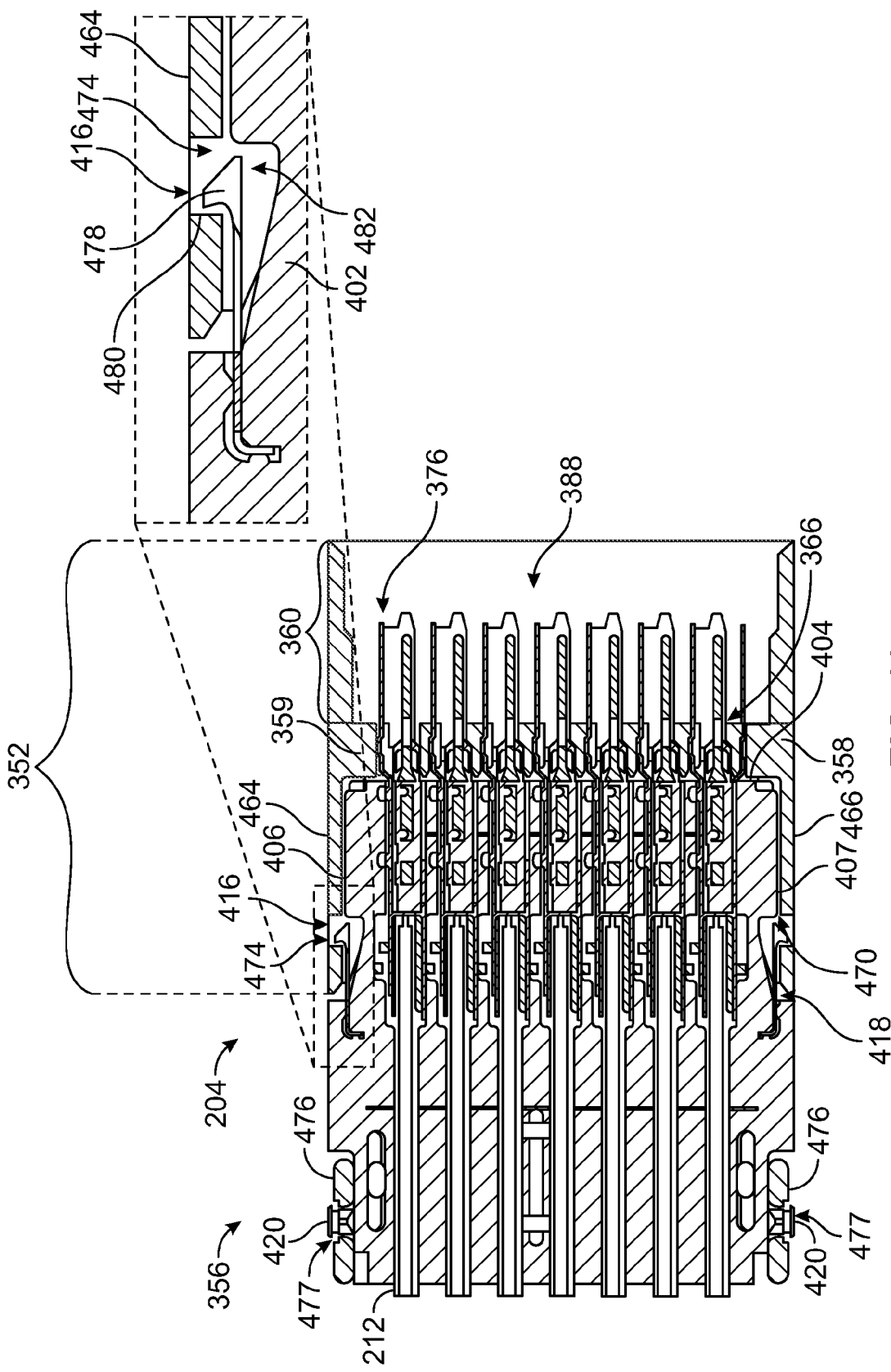
FIG. 10 is a cross-section of the cable connector illustrating a locking member for securing the contact module to the contact organizer

Also shown, the contact module 356 may be communicatively coupled to the communication cables 212 along the loading edge 405. Each of the communication cables 212 is electrically coupled to one of the contact assemblies 376. The contact assemblies 376 are stacked with respect to one another such that the contact assemblies 376 are arranged along a common plane and extend substantially parallel to one another. Also shown, the contact module 356 may include a coupling post 420 that is configured to facilitate coupling the contact module 356 to other contact modules 356. In the illustrated embodiment, the coupling post 420 projects from the longitudinal edge 406 and is located proximate to the loading edge 405. The longitudinal edge 407 may also include a coupling post 420 as shown in FIG. 10. In alternative embodiments, the coupling posts 420 may have other locations.

Figure 8:
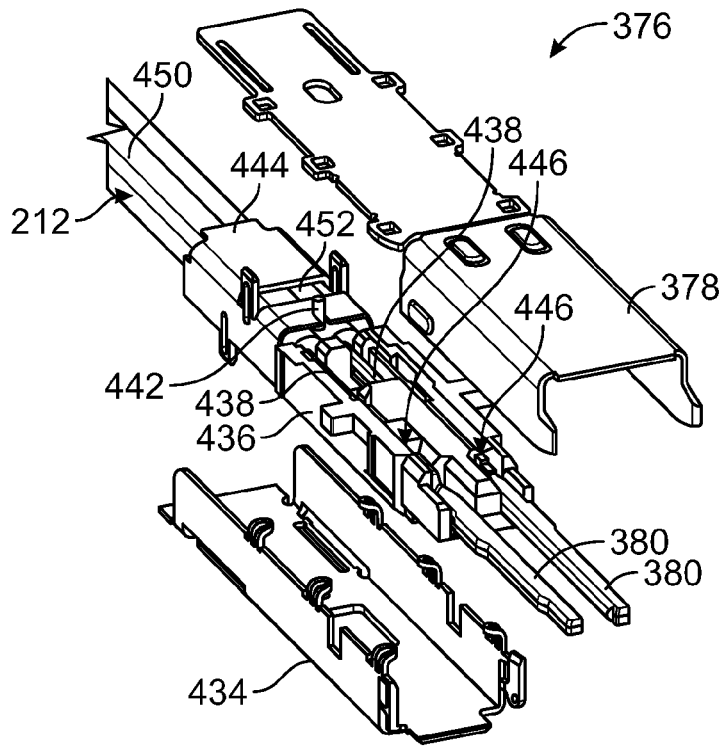
FIG. 8 is a contact assembly that may be incorporated within the contact module.

FIG. 8 is an exploded view of one of the contact assemblies 376 in accordance with an embodiment. As described herein, the contact assembly 376 includes the pair of cable contacts 380 and the ground contact 378. The contact assembly 376 may also include a ground shield 434, a support body 436, and a ground ferrule 444. As shown, a terminating end 452 of the communication cable 212 is stripped to expose a pair of signal conductors 438 and a drain wire 442. The signal conductors 438 may be shielded along a length of the communication cable 212 to reduce noise, crosstalk, and other interference along the signal paths. In particular embodiments, the communication cables 212 are twin axial cables having the two signal conductors 438 surrounded by a common jacket 450 of the communication cable 212. The signal conductors 438 extend parallel to each other through the jacket 450 and are configured to convey differential signals. However, other types of cables, such as coaxial cables, may be used in alternative embodiments.

The support body 436 is configured to hold the cable contacts 380 at designated positions for termination to the respective signal conductors 438. In the illustrated embodiment, the support body 436 has two contact channels 446 that each includes one of the cable contacts 380 disposed therein. The contact channels 446 are generally open along a side of the support body 436 to receive the cable contacts 380 therein. The support body 436 may include features to secure the cable contacts 380 in the respective contact channels 446. For example, the cable contacts 380 may be held by an interference fit therein.

The signal conductors 438 from the communication cable 212 are configured to extend into the contact channels 446 of the support body 436 for termination to the corresponding cable contacts 380. The support body 436 is shaped to guide or position the signal conductors 438 therein for termination. In an exemplary embodiment, the signal conductors 438 may be terminated to the cable contacts 380 in-situ after being loaded into the support body 436. For example, the support body 436 may position the cable contacts 380 and the corresponding signal conductors 438 in direct physical engagement. The cable contacts 380 and the corresponding signal conductors 438 may then be coupled together, such as through welding or soldering.

The ground ferrule 444 is secured to the terminating end 452 of the communication cable 212. The ground ferrule 444 is configured to be electrically coupled to the drain wire 442 and/or the ground contact 378 and the ground shield 434. The ground contact 378 and the ground shield 434 are configured to be coupled to each other such that the support body 436, the cable contacts 380, and the signal conductors 438 are located between the ground contact 378 and the ground shield 434. In this manner, the ground contact 378 and the ground shield 434 may peripherally surround the signal paths along the signal conductors 438 and cable contacts 380.

Figure 9:
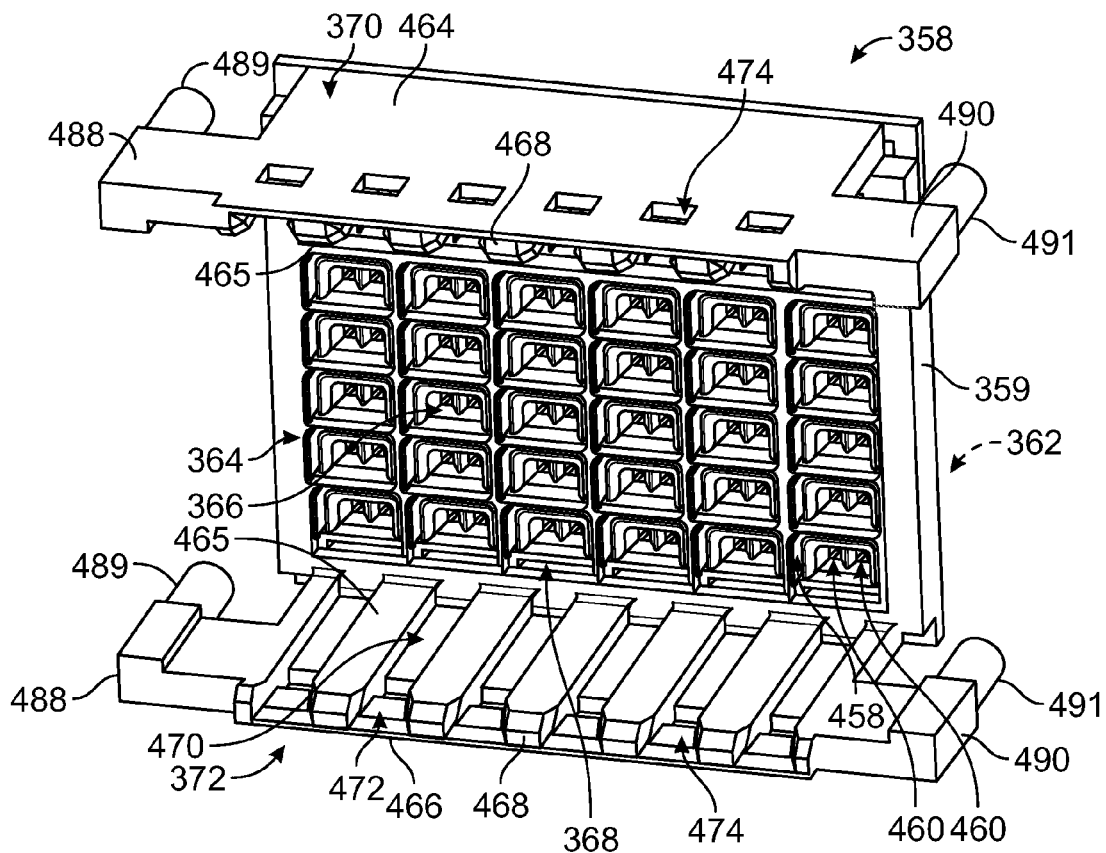
FIG. 9 is a rear perspective view of a contact organizer that may be part of the cable connector of FIG. 6.

FIG. 9 is a rear perspective view of the contact organizer 358. The contact organizer 358 may include a dielectric material. The contact organizer 358 is configured to engage and hold the contact modules 356 (FIG. 6) with respect to one another. The contact organizer 358 is also configured to support the contact assemblies 376 (FIG. 6). As described above, the contact organizer 358 includes the body extensions 370, 372 and the intermediate wall 359 joining the body extensions 370, 372. The intermediate wall 359 may include the mating and loading surfaces 362, 364 of the contact organizer 358 and the passages 366 of the passage array 368. The passages 366 are configured to permit the contact assemblies 376 to extend through the intermediate wall 359 so that the contact assemblies 376 may project beyond the mating surface 362. The passages 366 include ground passages 458 and signal passages 460 that extend through the intermediate wall 359 between the mating and loading surfaces 362, 364. The ground passages 458 are shaped to permit the ground contact 378 (FIG. 6) to be inserted therethrough and the signal passages 460 are shaped to permit the cable contacts 380 (FIG. 6) to be inserted therethrough.

The body extensions 370, 372 extend rearward from the loading surface 364 and include housing walls 464, 466, respectively. The housing walls 464, 466 engage and support the contact modules 356 during operation. The housing walls 464, 466 may also be configured to guide the contact modules 356 during loading so that the ground contacts 378 and the cable contacts 380 are inserted through the corresponding passages 366.

For example, each of the housing walls 464, 466 may extend from the loading surface 364 to a wall edge 468, and each of the housing walls 464, 466 may include wall rails 465 that extend toward the wall edge 468. The wall rails 465 may define guide channels 470 having inlets 472 proximate to the wall edge 468. The inlets 472 along the housing wall 464 are configured to receive the guide features 430 (FIG. 7) of the contact modules 356, and the inlets 472 along the housing wall 466 are configured to receive the guide features 432 (FIG. 7) of the contact modules 356. The guide channels 470 are dimensioned to direct the contact module 356 in a linear direction along the longitudinal axis 398 (FIG. 6) toward the loading surface 364 so that the contact assemblies 376 may be received by the passages 366 of the passage array 368.

In some embodiments, the housing walls 464, 466 also include locking recesses 474 along the corresponding guide channels 470. As described below, the locking recesses 474 are configured to receive the locking members 416, 418 (FIG. 7). The locking recesses 474 may operate to secure the module assembly 354 (FIG. 6) to the contact organizer 358.

Also shown in FIG. 9, each of the housing walls 464, 466 includes lateral projections 488, 490 that extend in opposite directions away from each other. The lateral projections 488, 490 include respective board-engaging elements 489, 491 that are configured to engage the circuit board 202 (FIG. 2). In the illustrated embodiments, the board-engaging elements 489, 491 are posts or plugs that are sized and shaped to be inserted into respective mount openings 584 (shown in FIG. 15) of the circuit board 202. In other embodiments, however, the board-engaging elements 489, 491 may be fasteners, such as screws, latches, and the like, that facilitate securing the contact organizer 358 and, consequently, the cable connector 204 (FIG. 2) to the circuit board 202.

FIG. 10 is a cross-section of the cable connector 204 when fully assembled illustrating one of the contact modules 356 engaged to the connector housing 352. As shown, the intermediate wall 359 is interposed between the leading edge 404 of the contact module 356 and the contact cavity 388 of the shroud 360. The contact assemblies 376 project beyond the leading edges 404, through the corresponding passages 366, and into the contact cavity 388. The housing wall 464 interfaces with the longitudinal edge 406 of the contact module 356, and the housing wall 466 interfaces with the longitudinal edge 407.

The coupling posts 420 along the respective longitudinal edges 406, 407 are configured to engage corresponding module-coupling elements 476. The module-coupling elements 476 may be panels or bands having cavities 477 that receive the coupling posts 420. The module-coupling elements 476 may extend laterally across the contact modules 356 to engage the coupling posts 420 of each of the contact modules 356. The coupling posts 420 may form an interference fit with the module-coupling elements 476.

During a loading operation, the contact modules 356 are inserted into the corresponding guide channels 470. The contact modules 356 may be loaded individually or may be inserted as a group into the contact organizer 358. FIG. 10 also illustrates an enlarged view of the locking member 416 engaged with the housing wall 464. Although the following is with specific reference to the locking member 416 and the housing wall 464, it is understood that the description may be similarly applied to the locking member 418 and the housing wall 466. As the contact module 356 slides along the housing wall 464, a distal tip 478 of the locking member 416 engages the housing wall 464 and is deflected inward toward the contact assemblies 376. In the illustrated embodiment, the distal tip 478 is deflected into a frame opening or recess 482 of the module frame 402.

When the distal tip 478 clears the housing wall 464 and is permitted to enter the locking recess 474, the locking member 416 may resiliently flex in an outward direction so that the distal tip 478 exits the frame opening 482 and enters the locking recess 474. The locking recess 474 is at least partially defined by a blocking surface 480 that operates as a positive stop. More specifically, the distal tip 478 is configured to engage the blocking surface 480 if the communication cables 212 (FIG. 2) or the contact module 356 are inadvertently pulled or withdrawn from the operative position. This locking mechanism between the locking member 416 and the blocking surface 480, and also frictional forces generated between the contact assemblies 376 and interior surfaces that define the passages 366, may operate to secure the contact modules 356 to the connector housing 352.

Figure 11:
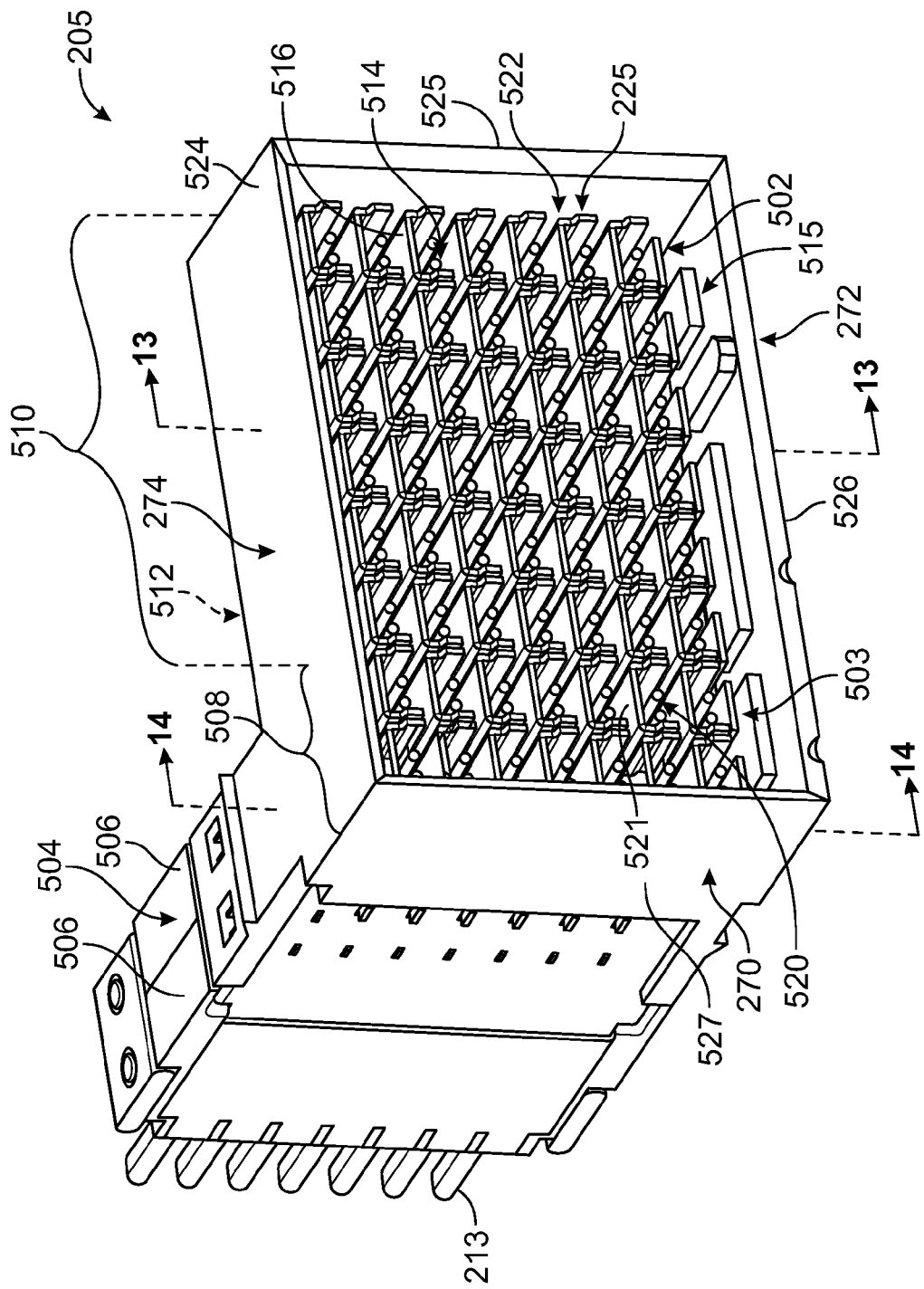
FIG. 11 is a front perspective view of a hybrid connector that may be used with the communication system of FIG. 2.

FIG. 11 is a front perspective view of the hybrid connector 205. In the illustrated embodiment, the hybrid connector 205 includes the connector housing 274, contact assemblies 502, and a module assembly 504 having multiple contact modules 506 that each include contact assemblies 503. As described herein, the hybrid connector 205 may include one or more portions that are similar or identical to the cable connector 204 (FIG. 2) and one or more portions that are similar or identical to the board connector 203 (FIG. 2).

For example, the hybrid connector 205 includes the cable connector 270 and the board connector 272. In the illustrated embodiment, the cable connector 270 and the board connector 272 share sections of the connector housing 274. In particular, the cable connector 270 includes the module assembly 504 and a cable section 508 of the connector housing 274.

The board connector 272 includes a board section 510 of the connector housing 274 and the contact assemblies 502.

The connector housing 274 includes an intermediate wall 528 (shown in FIG. 12) and shroud walls 524, 525, 526, 527 that project from the intermediate wall 528 and define a shroud of the connector housing 274. The shroud walls 524-527 and the intermediate wall 528 may define a common contact cavity 515 of the hybrid connector 205. In the illustrated embodiment, the connector housing 274 is a unitary structure that is not readily separable between the cable and board sections 508, 510. For example, the shroud walls 524, 526 and the intermediate wall 528 may be continuous structures that extend along the cable and board sections 508, 510 such that the shroud walls 524, 526 and the intermediate wall 528 are shared by the cable and board sections 508, 510. As such, the cable connector 270 and the board connector 272 may not be readily separable from each other. In alternative embodiments, however, the cable connector 270 and the board connector 272 may be readily separable from each other. Such an embodiment is shown and described with respect to FIG. 16.

The connector housing 274 has the mating side 225 and a mounting side 512 that face in opposite directions with respect to each other. The mating side 225 is configured to mate with a data connector (not shown), and the mounting side 512 is configured to engage the circuit board 202 (FIG. 2). The contact assemblies 502 include board contacts 514 and ground contacts 516. The board and ground contacts 514, 516 may be similar or identical to the board and ground contacts 308, 310, respectively.

The module assembly 504 includes multiple contact modules 506. In other embodiments, however, the module assembly 504 may include only a single contact module 506. The module assembly 504 also includes the communication cables 213 that are operatively coupled to the corresponding contact modules 506. The contact modules 506 may be similar or identical to the contact module 356 (FIG. 6). The contact assemblies 503 include cable contacts 520 that are electrically coupled to corresponding communication cables 213, and ground contacts 521.

As shown, the cable contacts 520 extend through and/or are disposed within the cable section 508 of the connector housing 274, and the board contacts 514 extend through and/or are disposed within the board section 510 of the connector housing 274. The board contacts 514 and the cable contacts 520 may form a common contact array 522 that is disposed within the contact cavity 515 and is configured to engage the data connector. The board contacts 514 and the cable contacts 520 may be substantially evenly distributed in the contact array 522. In some embodiments, the contact array 522 is a high density two-dimensional array having at least 12 signal contacts per 100 mm². In more particular embodiments, the contact array 522 may have at least 20 signal contacts per 100 mm².

In some embodiments, the hybrid connectors set forth herein are configured to be compatible with data connectors that were designed to engage electrical connectors that are exclusively board connectors or electrical connectors that are exclusively cable connectors. More specifically, the hybrid connectors may have mating interfaces that are effectively identical with the mating interfaces of the board and cable connectors so that the data connectors are capable of mating with the hybrid connectors. As used herein, a "mating interface" includes the conductive surfaces of the electrical contact(s) and other non-conductive surfaces that may be engaged during a mating operation with another component. For example, in the illustrated embodiment, each of the contact assemblies 502, 503 includes C-shaped ground contacts and pin-shaped signal contacts. All of the ground contacts are commonly sized and shaped, and all of the signal contacts are commonly sized and shaped. Moreover, the ground contact and the signal contacts for each contact assembly are positioned relative to one another in the same manner. Thus, each of the contact assemblies 502, 503 may have effectively identical mating interfaces. Such embodiments may provide a technician or designer of a communication system more options for configuring the system.

Figure 12:
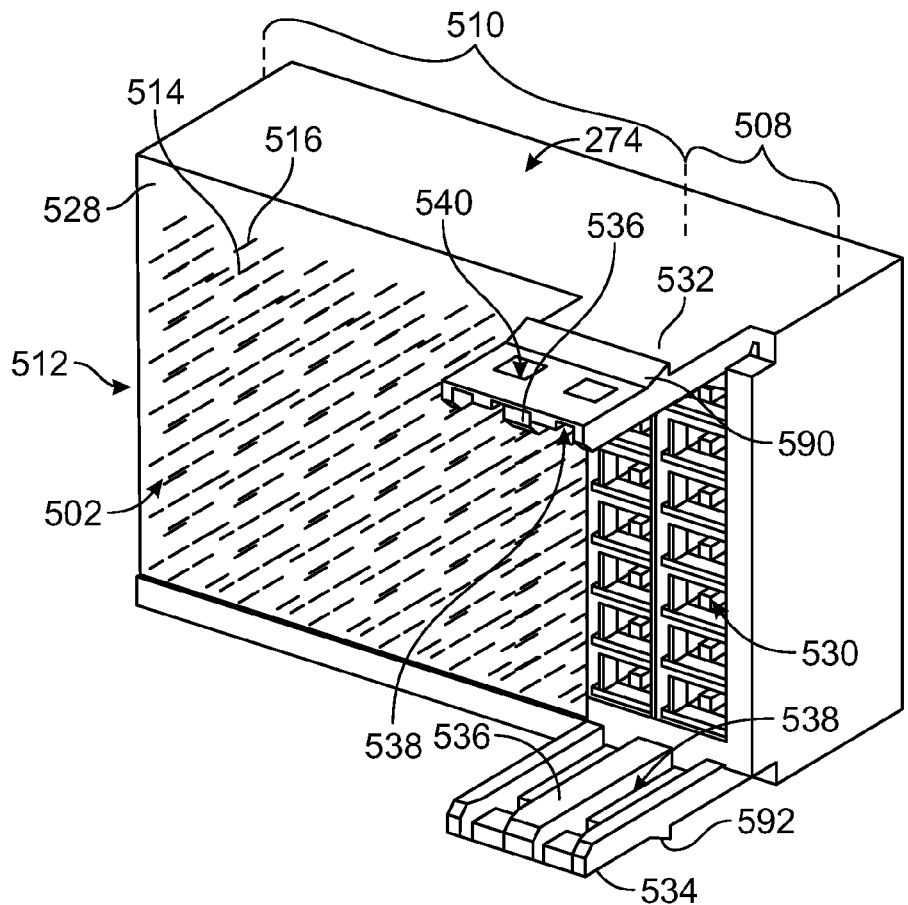
FIG. 12 is a rear perspective view of a connector housing of the hybrid connector that may be used with the communication system of FIG. 2.

FIG. 12 is a rear perspective view of the connector housing 274 having the contact assemblies 502 coupled thereto. The intermediate wall 528 extends along and may define the mounting side 512. As shown, the intermediate wall 528 is shared by the cable and board sections 508, 510 of the connector housing 274. In the board section 510, the intermediate wall 528 includes passages that permit the board and ground contacts 514, 516 of the contact assemblies 502 to be inserted therethrough. In the cable section 508, the intermediate wall 528 includes passages 530 that permit the cable and ground contacts 520, 521 (FIG. 11) to be inserted therethrough.

The board section 510 of the connector housing 274 may be similar to the connector housing 306 (FIG. 4) and includes the board and ground contacts 514, 516 being coupled thereto. The cable section 508 may be similar to the connector housing 352 (FIG. 6). For example, the cable section 508 includes rearward body extensions 532, 534. The body extensions 532, 534 may include wall rails 536 that define guide channels 538. The guide channels 538 may be dimensioned to direct the corresponding contact module 506 (FIG. 11) so that the cable and ground contacts 520, 521 are inserted through the corresponding passages 530.

Also shown, the body extensions 532, 534 include locking recesses 540 along the corresponding guide channels 538, and board-gripping elements 590, 592 along exterior surfaces of the body extensions 532, 534, respectively. The board-gripping elements 590, 592 are configured to engage the board side 208 (FIG. 2) of the circuit board 202.

In the illustrated embodiment, the connector housing 274 includes only one cable section 508 and only one board section 510. In alternative embodiments, the connector housing 274 may include more than one board section and/or more than one cable section. For example, a board section may extend between two cable sections that are on opposite ends of the connector housing 274.

Figure 13:
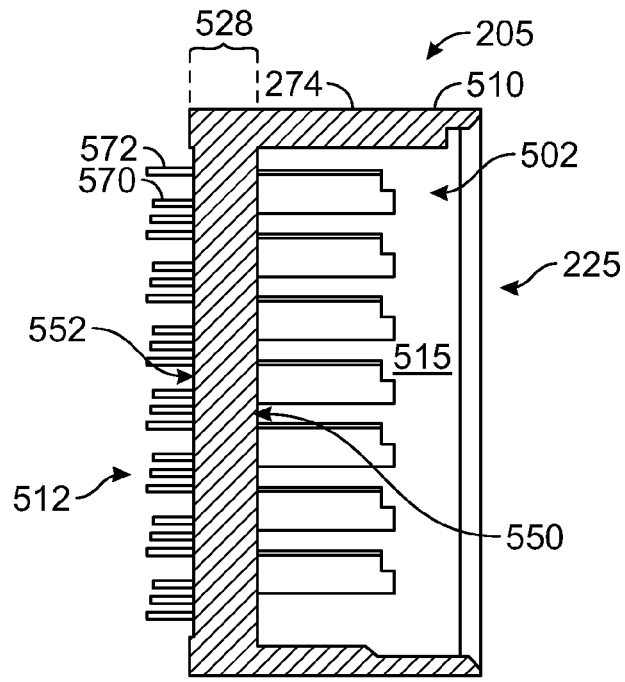
FIG. 13 is a cross-section of the hybrid connector taken along the line 13-13 in FIG. 11.

FIG. 13 is a cross-section of the board section 510 of the hybrid connector 205 taken along the line 13-13 in FIG. 11. The intermediate wall 528 has opposite mating and mounting surfaces 550, 552. In the board section 510, the mating surface 550 is configured to face the data connector (not shown) and the mounting surface 552 is configured to interface with the circuit board 202 (FIG. 2). The mating side 225 includes the mating surface 550, the contact assemblies 502, and the contact cavity 515 defined by the connector housing 274. The mounting side 512 includes the mounting surface 552 and mounting pins 570, 572 of the board and ground contacts 514, 516 (FIG. 11), respectively. As shown, the mounting pins 570, 572 are disposed along the mounting surface 552. The mounting pins 570, 572 may be compliant press-fit pins.

Figure 14:
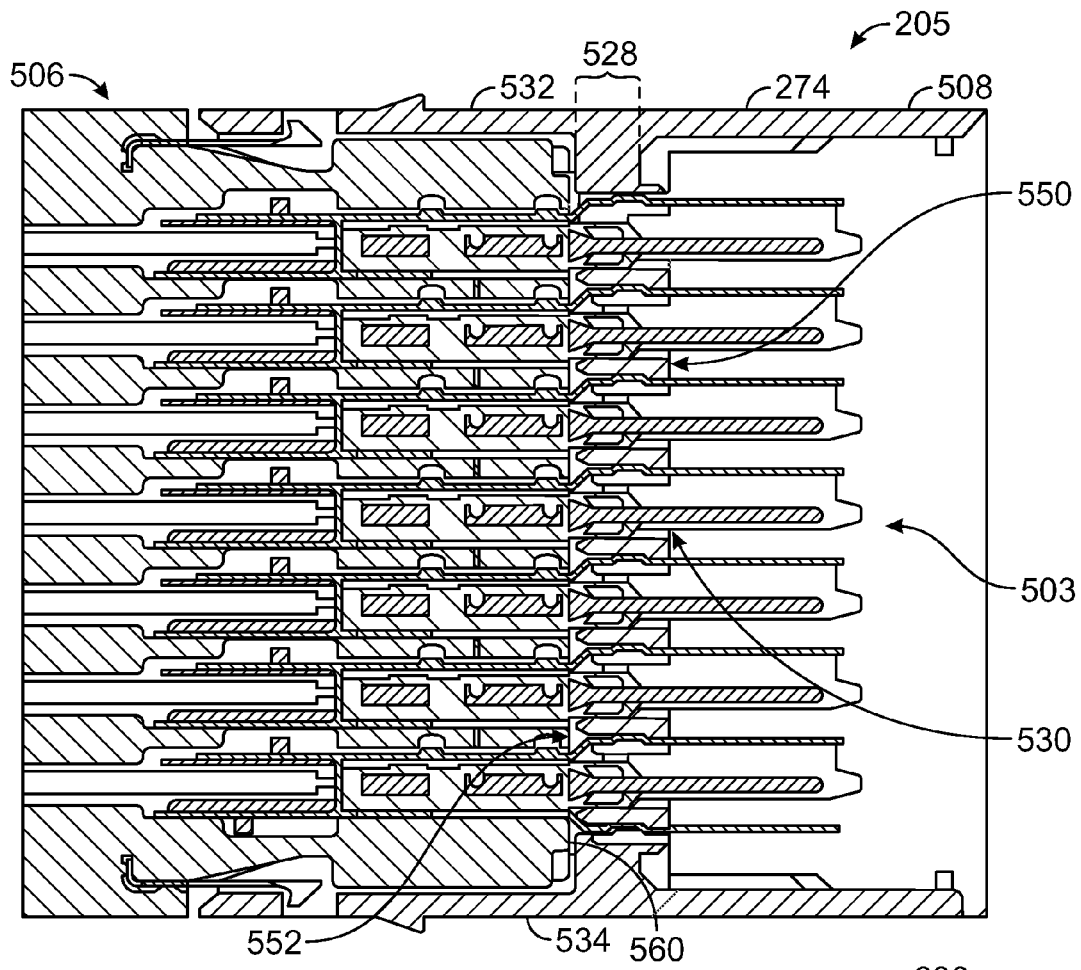
FIG. 14 is a cross-section of the hybrid connector taken along the line 14-14 in FIG. 11.
Figure 15:
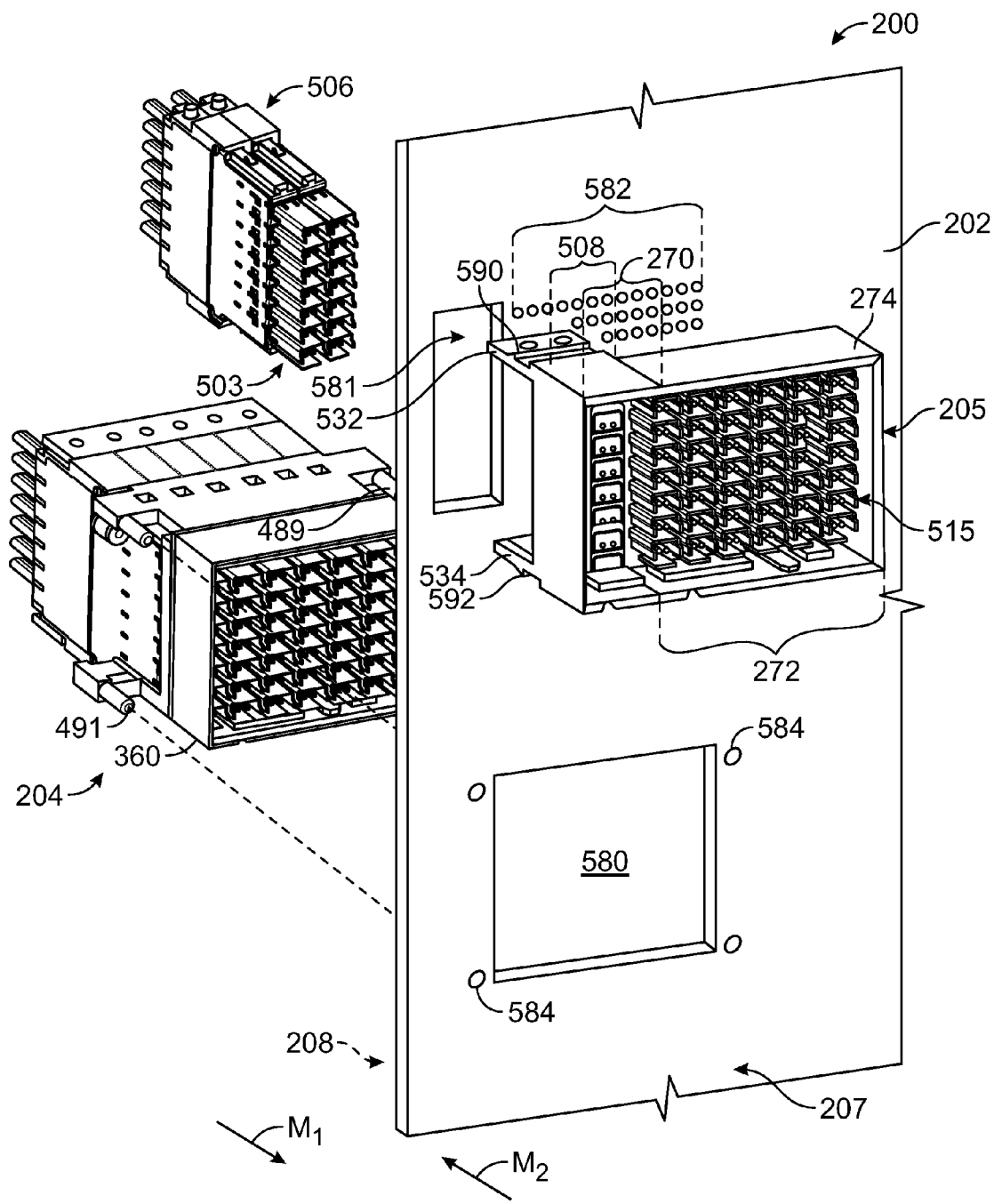
FIG. 15 is a partially exploded view of a portion of the communication system of FIG. 2.

FIG. 14 is a cross-section of the cable section 508 of the hybrid connector 205 taken along the line 14-14 in FIG. 11. As described above, the intermediate wall 528 is shared by the cable section 508 and the board section 510 (FIG. 11). The contact module 506 shown in FIG. 14 has a leading edge 560 with the contact assemblies 503 disposed along the leading edge 560. When the contact module 506 is coupled to the connector housing 274, the contact module 506 may slide along and engage the body extensions 532, 534 in a similar manner as the contact module 356 (FIG. 6) and the connector housing 352 (FIG. 6) engage each other. In the cable section 508, the mating surface 550 of the intermediate wall 528 is configured to face the data connector (not shown), and the mounting surface 552 of the intermediate wall 528 interfaces with the leading edge 560 of the contact module 506. The portion of the intermediate wall 528 that includes the passages 530 functions similarly as the contact organizer 358 (FIG. 6) and, as such, may also be referred to as a contact organizer FIG. 15 is a partially exploded view of a portion of the communication system 200. In particular, FIG. 15 shows the communication system 200 prior to the cable connector 204 and the hybrid connector 205 being mounted to the circuit board 202. As shown, the circuit board 202 includes mounting holes 580, 581 and a mounting area 582 that is adjacent to the mounting hole 581. The mounting hole 580 is sized and shaped to receive the shroud 360 of the cable connector 204. The cable connector 204 may be advanced in a first mounting direction $M_1$ and inserted through the mounting hole 580 from the board side 208. When mounted to the circuit board 202, the cable connector 204 may project beyond the board side 207.

As shown, the circuit board 202 may also include mount openings 584. The mount openings 584 are sized and shaped to receive the board-engaging elements 489, 491 of the cable connector 204. The board-engaging elements 489, 491 may form an interference fit with the surfaces that define the mount openings 584. Alternatively, the board-engaging elements 489, 491 may be threaded fasteners that are inserted into the mount openings 584 and secure the cable connector 204 to the circuit board 202.

The mounting hole 581 is sized and shaped to receive the body extensions 532, 534. The connector housing 274 may be advanced in a second mounting direction $M_2$ that is opposite the first mounting direction $M_1$ and the body extensions 532, 534 of the cable section 508 may be inserted through the mounting hole 581 from the board side 207. In the illustrated embodiment, the board-gripping elements 590, 592 engage edges of the board side 207 that define the mounting hole 581 such that the body extensions 532, 534 are deflected inwardly toward each other. As the body extensions 532, 534 are inserted through the mounting hole 581, the board connector 272 of the hybrid connector 205 may engage the mounting area 582. More specifically, the mounting pins 570, 572 (FIG. 13) may be inserted into vias (not shown) in the mounting area 582. After mounting the board connector 272, construction of the cable connector 270 may be completed by inserting the contact modules 506 into the connector housing 274. More specifically, the contact modules 506 may be advanced in the first mounting direction $M_1$ to insert the contact assemblies 503 into the contact cavity 515.

Figure 16:
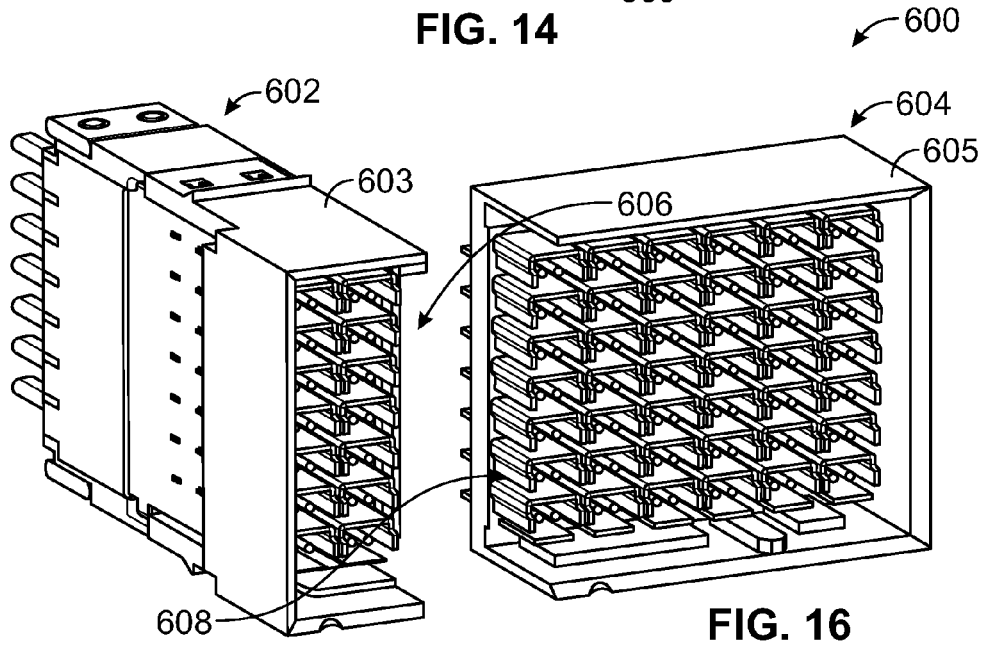
FIG. 16 is a perspective view of a hybrid connector formed in accordance with an embodiment.

FIG. 16 is a perspective view of a hybrid connector 600 formed in accordance with an embodiment. As shown, the hybrid connector 600 includes a cable connector (or cable connector portion) 602 and a board connector (or board connector portion) 604. The cable connector 602 may be similar to the cable connector 270 (FIG. 2), and the board connector 604 may be similar to the board connector 272 (FIG. 2). However, the cable connector 602 and the board connector 604 have separable housing portions 603, 605, respectively. In the illustrated embodiment, the housing portions 603, 605 have open sides 606, 608 that open to each other.

The cable connector 602 and the board connector 604 are configured to be combined together on a backplane or midplane circuit board (not shown) to form the hybrid connector 600. For example, the board connector 604 may be mounted to a mounting area (not shown) that is adjacent to a mounting hole (not shown). The cable connector 602 may be inserted through the mounting hole such that the cable connector 602 and the board connector 604 are immediately adjacent to each other and combine to form the hybrid connector 600. The housing portions 603, 605 may combine to form a common contact cavity. When the housing portions 603, 605 are combined, the open sides 606, 608 may become part of the contact cavity.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled.

As used in the description, the phrase "in an exemplary embodiment" and the like means that the described embodiment is just one example. The phrase is not intended to limit the inventive subject matter to that embodiment. Other embodiments of the inventive subject matter may not include the recited feature or structure. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A communication system comprising:
   a circuit board having opposite board sides and mounting areas located on at least one of the board sides, the circuit board including conductive traces that extend along the circuit board between corresponding mounting areas, the circuit board having mounting holes extending therethrough;
   board connectors mounted to the circuit board at the mounting areas, the board connectors being communicatively coupled to one another through the conductive traces;
   cable connectors secured to the circuit board and positioned at the mounting holes; and
   communication cables interconnecting corresponding cable connectors to one another.

2. The communication system of claim 1, wherein at least one of the cable connectors and at least some of the board connectors are aligned to form a linear array of connectors.

3. The communication system of claim 1, wherein the cable connectors and the board connectors are positioned to form a two-dimensional connector array of rows and columns.

4. The communication system of claim 3, wherein at least one of the cable connectors is located within a row or column that extends along a periphery of the connector array.

5. The communication system of claim 1, wherein the board connectors include a first board connector and the cable connectors include a first cable connector, the first board connector and the first cable connector being adjacent to each other to form a hybrid connector that is configured to engage a single data connector.

6. The communication system of claim 5, wherein the first board connector includes board contacts configured to be inserted into vias of the circuit board and the first cable connector includes cable contacts that are electrically coupled to the communication cables, the board contacts and the cable contacts combining to form a common contact array to engage the data connector.

7. The communication system of claim 6, wherein the board contacts and the cable contacts have effectively identical mating interfaces.

8. The communication system of claim 5, wherein the first board connector and the first cable connector share a connector housing having a shroud, the shroud defining a contact cavity having the board contacts and the cable contacts disposed therein.

9. The communication system of claim 1, wherein the board sides include first and second board sides, the cable connectors being directly secured to the first board side and extending through the mounting holes beyond the second board side.

10. The communication system of claim 1, further comprising a daughter card assembly having a daughter card and data connectors coupled to the daughter card, the data connectors engaging at least one of the cable connectors and at least one of the board connectors.

11. An electrical connector comprising:
a connector housing having opposite mating and mounting sides and a contact cavity that opens to the mating side, the connector housing including a board section and a cable section that are each configured to engage a common data connector along the mating side, the board section configured to engage a circuit board along the mounting side, the board section and the cable section defining respective portions of the contact cavity that are each configured to receive the common data connector;
board contacts coupled to the board section of the connector housing, the board contacts configured to directly engage vias of the circuit board;
cable contacts positioned along the cable section of the connector housing proximate to the board contacts; and
communication cables terminated to the cable contacts, wherein the board contacts and the cable contacts collectively form a common contact array along the mating side that is configured to engage the data connector and that is positioned within the contact cavity.

12. The electrical connector of claim 11, wherein the board contacts include mounting pins disposed along the mounting side, the mounting pins being compliant press-fit pins configured for insertion into the vias of the circuit board.

13. The electrical connector of claim 11, wherein the connector housing includes an intermediate wall that extends along the board and cable sections, the board contacts and the cable contacts extending through the intermediate wall.

14. The electrical connector of claim 11, wherein the connector housing is a unitary structure such that the cable section and the board section are not separable.

15. The electrical connector of claim 11, wherein the board contacts and the cable contacts are substantially evenly distributed in the common contact array and the common contact array has at least 12 contacts per 100 mm$^2$.

16. An electrical connector comprising:
a connector housing having opposite mating and mounting sides, the connector housing including a board section and a cable section that are each configured to engage a common data connector along the mating side, the board section configured to engage a circuit board along the mounting side;
board contacts coupled to the board section of the connector housing, the board contacts configured to directly engage vias of the circuit board;
cable contacts positioned along the cable section of the connector housing proximate to the board contacts;
communication cables terminated to the cable contacts, wherein the board contacts and the cable contacts collectively form a common contact array along the mating side that is configured to engage the data connector; and
a contact module having a module frame and at least some of the cable contacts that are supported by the module frame;
wherein the connector housing includes a body extension that projects in a rearward direction toward the circuit board and couples to the contact module.
wherein the body extension includes a board-gripping element and wherein the board section is configured to engage a first side of the circuit board, the body extension being sized for inserting through a hole in a circuit board, the board-gripping element configured to engage an opposite second side of the circuit board.

17. An electrical connector comprising:
a connector housing having opposite mating and mounting sides, the connector housing including a board section and a cable section that are each configured to engage a common data connector along the mating side, the board section configured to engage a circuit board along the mounting side;
board contacts coupled to the board section of the connector housing, the board contacts configured to directly engage vias of the circuit board;
cable contacts positioned along the cable section of the connector housing proximate to the board contacts; and
communication cables terminated to the cable contacts, wherein the board contacts and the cable contacts collectively form a common contact array along the mating side that is configured to engage the data connector;
wherein the board section and the cable section are separable components that include respective housing portions, the respective housing portions being combined side-by-side to form the connector housing, each of the respective housing portions defining a portion of the mating side.

18. The electrical connector of claim 17, wherein the board contacts and the cable contacts have effectively identical mating interfaces.

19. The electrical connector of claim 17, wherein the board contacts and the cable contacts are substantially evenly distributed in the contact array and the contact array has at least 12 contacts per 100 mm$^2$.

20. The electrical connector of claim 17, wherein each of the respective housing portions includes a cavity portion, the cavity portions being combined to form a common contact cavity that is configured to receive the common data connector, the contact array being disposed within the contact cavity.

* * * * *